L. BECKER.

Straw Cutter.

No. 9,642. Reissued April 5, 1881.

Attest,
W. H. H. Knight
Fred F. Church.

Inventor,
Leander Becker
By Hill & Church
Their atts

N. PETERS, PHOTO-LITHOGRAPHER, WASHINGTON, D. C.

UNITED STATES PATENT OFFICE.

LEANDER BECKER, OF YORK, PENNSYLVANIA.

STRAW-CUTTER.

SPECIFICATION forming part of Reissued Letters Patent No. 9,642, dated April 5, 1881.

Original No. 178,713, dated June 13, 1876. Application for reissue filed October 30, 1880.

*To all whom it may concern:*

Be it known that I, LEANDER BECKER, of York, in the county of York and State of Pennsylvania, have invented certain new and useful Improvements in Feed-Cutting Machines; and I do hereby declare the following to be a full, clear, and exact description of the same, reference being had to the accompanying drawings forming part of this specification, in which—

Figure 1:
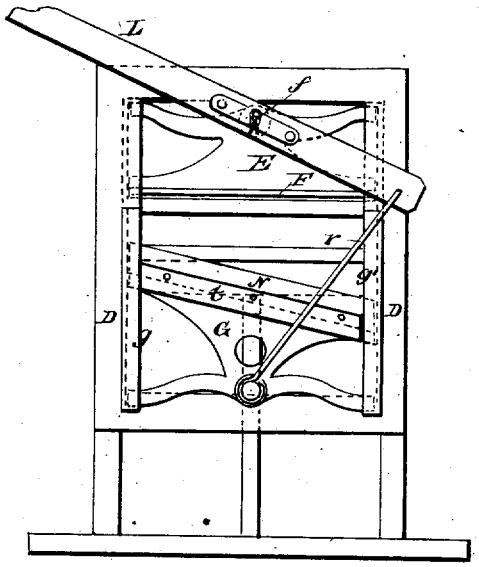
Figure 2:
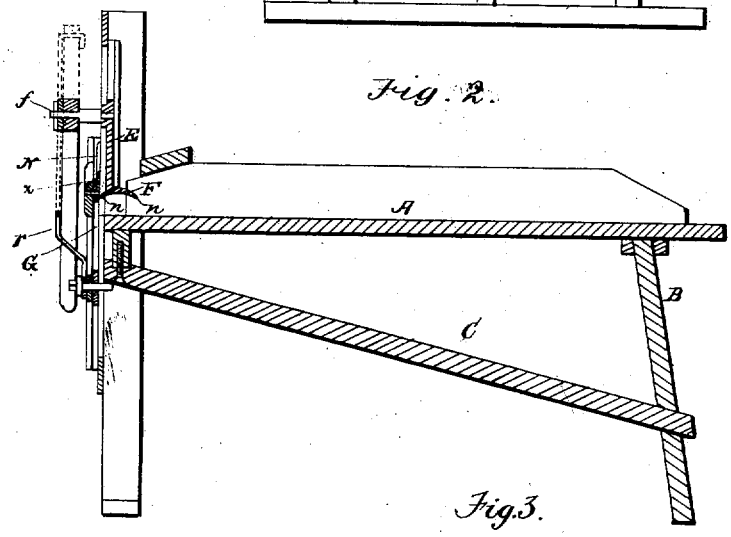
Figure 3:
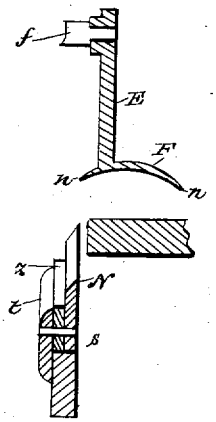

Figure 1 represents an end view of the invention; Fig. 2, a longitudinal vertical section of the same. Fig. 3 is a view showing the support for the material, the clamp, and the cutting-knife in section.

Similar letters of reference in the several figures denote the same parts.

This invention relates to improvements in feed-cutting machines; and it consists in certain improved details of construction and novel combinations of parts, which will be hereinafter described, and pointed out in the claims.

In the embodiment of the invention represented in the accompanying drawings, A indicates the table or support upon which the material to be cut is placed, havings legs B, and strengthened and stayed by a diagonal brace, C. To the front of this table is secured a metal frame, D, the inner vertical edges of which are provided with parallel grooves, *g g'*, that respectively form ways or guides for a sliding clamp-frame, E, and a knife-frame, G. The upper and lower ends of the grooves are left open, in order that the parts E G may be readily removed when necessary.

The sliding clamp-frame E is preferably made of metal, and along its lower edge extends a pressure-bar, F, which is preferably made concave transversely on its under side, so that when it descends its two edges, *n n*, hold the material securely and prevent slipping. A pin or pivot, *f*, is attached to the clamp-frame and forms the fulcrum of an operating-lever, L. The knife-frame G is also preferably made of metal, and is connected to the operating-lever L by a connecting-rod, *r*, as shown. Its upper portion is recessed or shouldered, as indicated at *s*, to form a seat for the knife N, and it is inclined from end to end for the purpose of giving the knife a shearing cut.

When the edge of the pressure-bar or clamp against which the knife cuts wears away by continued use, wedges or packing *z* may be interposed between the knife and the flange *t* of the knife-frame, to compensate for such wear.

The machine is shown in its normal position in Fig. 1, the clamp or pressure-bar being down upon the table or support and the knife-frame at the lower end of the guides.

To operate the machine, the handle of the lever is lifted so as to cause the clamp to rise above the table or support and permit the material to be fed forward under the clamp and into the path of the knife. The lever and clamp-frame are then brought down, or allowed to fall by their own weight until the pressure-bar or clamp rests upon the top of material. A further downward movement of the handle of the lever causes the lever to rock on its fulcrum or pivot *f*, the knife-frame to be brought up, and its knife to sever, with a shearing cut, that portion of the material that projects beyond the table or support.

Inasmuch as the fulcrum of the lever which operates the knife is located upon the frame of the clamp, it is evident that the resistance which the knife encounters in cutting through the material is transferred to the clamp, and causes the latter to exert a corresponding amount of pressure upon the material. The clamp is thus made automatic and self-adjusting in its operation, bearing with greatest force upon materials that offer the greatest resistance to the action of the knife, and exerting but gentle pressure upon those materials that are more easily cut.

It will be observed that the clamp not only clamps the material while it is being severed, but also clamps it, though not so firmly, both before and after the severing operation. A cleaner cut is thus made, and the material remaining on the support is not disarranged.

I claim as my invention—

1. In a feed-cutting machine, a support for the material to be cut, a movable clamp arranged above the support and adapted to drop by gravity upon and hold the material before the cutting-knife goes into operation, a cutting-knife arranged below the support, and mechanism connected to the clamp and to the knife which operates to bring up the knife to cut the material and also to cause the clamp to apply an increased pressure proportioned to the resistance offered to the action of the knife.

2. In a feed-cutting machine, the combination of a support for the material, a movable clamp for clamping the material to the support, a movable knife, and a lever fulcrumed to the clamp and connected to the knife, whereby, by the operation of the lever, the material is first clamped and then cut, substantially as described.

3. In a feed-cutting machine, the combination of a support for the material, a movable clamp and a movable knife adapted to be reciprocated to and from each other in vertical guides, and an operating-lever fulcrumed to the clamp and connected, by a rod, to the knife, substantially as described.

4. In a feed-cutting machine, the combination of the clamping-frame E and knife-frame G, having reciprocating motion toward and from each other, with the lever L, having its fulcrum *f* on said clamping-frame, and the connecting-rod *r*, substantially as described.

5. The clamping-frame E, having the transversely-concaved pressure-bar or clamp F, substantially as described, for the purpose specified.

LEANDER BECKER.

Witnesses:
J. H. BUSY,
JOHN L. ALEXANDER.